Dec. 19, 1950     G. E. DATH     2,534,419

SHOCK ABSORBER FOR RAILWAY CAR TRUCKS

Filed Feb. 3, 1949

Inventor:
George E. Dath.
By Henry Fucks.
Atty.

Patented Dec. 19, 1950

2,534,419

UNITED STATES PATENT OFFICE 2,534,419

SHOCK ABSORBER FOR RAILWAY CAR TRUCKS

George E. Dath, Mokena, Ill., assignor to W. H. Miner, Inc., Chicago, Ill., a corporation of Delaware Application February 3, 1949, Serial No. 74,403

5 Claims. (Cl. 267—9)

1

This invention relates to improvements in shock absorbers more particularly adapted for use as snubbers for dampening the action of truck springs of railway cars.

One object of the invention is to provide a shock absorber of the character indicated, comprising a plurality of relatively slidable friction elements which are actuated during compression and recoil of the truck springs, wherein the friction elements are forced into tight frictional contact with each other by resilient means in the form of a rubber pad or block, which is forcibly deformed by the action of the friction elements, during relative movement thereof, to press the friction elements against each other.

A further object of the invention is to provide a mechanism as set forth in the preceding paragraph, wherein the friction elements comprise a friction casing and a pair of friction shoes slidingly telescoped within and movable lengthwise with respect to the casing and also with respect to each other, and wherein the deformable rubber pad or block is disposed between the shoes and is expanded in lateral direction through relative lengthwise movement of said shoes with respect to each other to force the shoes laterally apart into tight frictional contact with the interior of the casing.

A still further object of the invention is to provide a friction shock absorber, including a friction casing and a pair of friction shoes slidingly telescoped within the casing, wherein the shoes have relative lengthwise movement with respect to each other, and wherein movement of the shoes with respect to the casing is yieldingly resisted by rubber pad members, one of which reacts between one of said shoes and the casing, and the other of which yieldingly opposes relative movement of the shoes with respect to each other and is deformed through said relative movement of the shoes to expand and press the shoes laterally apart into frictional contact with the interior of the casing.

Other objects of the invention will more clearly appear from the description and claims hereinafter following.

Figure 1:
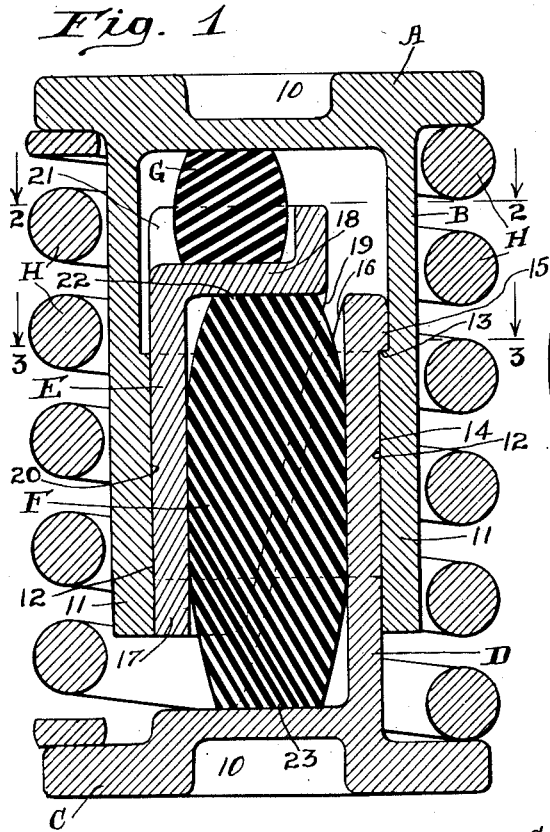
Figure 2:
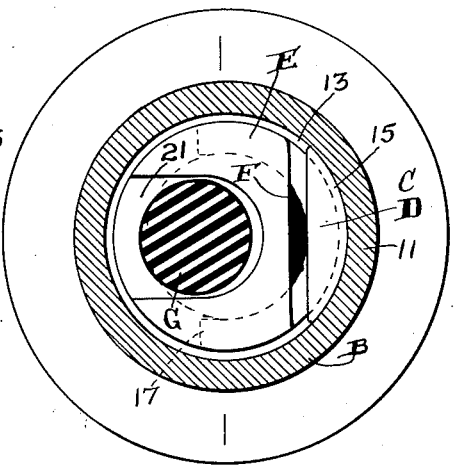
Figure 3:
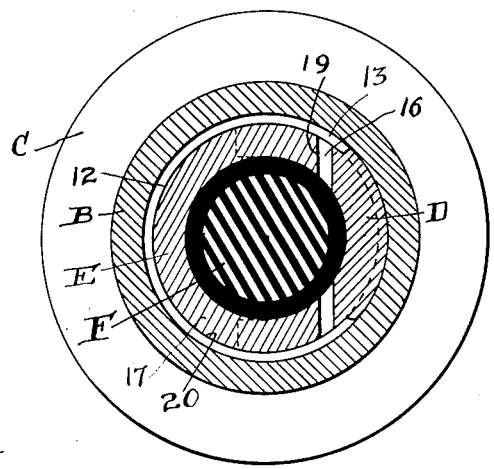
Figure 4:
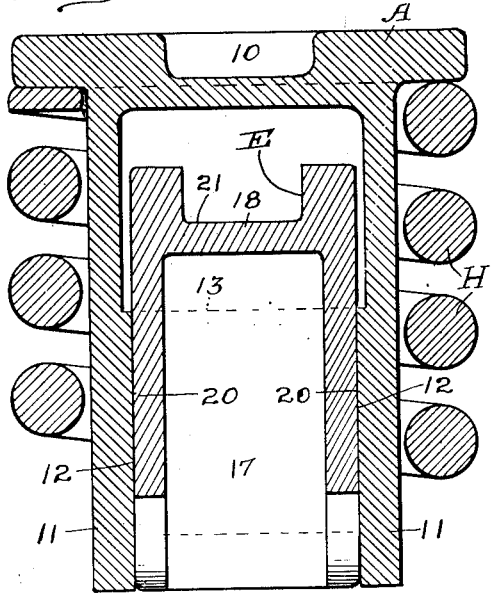

In the accompanying drawing forming a part of this specification, Figure 1 is a vertical sectional view of my improved shock absorber. Figures 2 and 3 are horizontal sectional views, corresponding respectively to the lines 2—2 and 3—3 of Figure 1. Figure 4 is a vertical sectional view, corresponding substantially to the line 4—4 of Figure 2, with the rubber blocks and lower friction shoe omitted.

2

Referring to the drawing, my improved shock absorber comprises broadly a top follower A; a friction casing B depending from the top follower; a bottom follower C; a friction shoe D upstanding from said bottom follower and slidingly engaged within the casing; a second friction shoe E slidingly engaged within the casing; a rubber block F interposed between the shoes and yieldingly opposing relative lengthwise movement thereof with respect to each other; a second rubber block G reacting between the shoe E and the casing B, opposing relative lengthwise movement thereof; and a coil spring H surrounding the casing and shoes and interposed between the top and bottom followers A and C to yieldingly oppose relative approach thereof.

The top and bottom followers A and C are of similar construction, each being in the form of a platelike disc, provided with a central recess 10, providing a seat for the usual spring centering projection of the corresponding spring follower plate, not shown, of the spring cluster of a railway car truck.

The friction casing B is in the form of a cylindrical, tubular member depending from the follower A and formed integral therewith. The casing B is open at the bottom and has its vertical side wall thickened at the open end to provide a friction shell section 11, presenting a lengthwise extending, interior friction surface 12, and an annular, transverse stop shoulder 13 at the inner end of said friction surface.

The friction shoe D is formed integral with the follower C, being located at the right hand side thereof, as viewed in Figure 1. The shoe D is of curved, transverse cross section and extends vertically from the follower C into the casing B. At the outer side, the shoe D has a lengthwise extending, transversely curved friction surface 14 in sliding contact with the interior friction surface 12 of the casing at the corresponding side of the mechanism. The upper end portion of the shoe is laterally outwardly enlarged to provide a horizontal shoulder 15, which is engageable in back of the shoulder 13 of the casing to limit outward movement of the shoe D with respect to the casing. At the inner side of the shoe D, the outer edge portions of the side walls thereof are cut away at an inclination, as indicated at 16—16.

The shoe E comprises a transversely curved, heavy platelike main body portion 17 and a laterally inwardly extending, heavy flangelike portion 18 at its upper end. The flangelike portion 18 is located at the concave side of the platelike portion 17 of the shoe and extends from one side wall to the other thereof, thus providing a transverse top wall at the upper end of the shoe, which forms a follower. At the inner side of the shoe E, the outer edge portions of the side walls thereof are cut away at an inclination, as indicated at 19—19. The inclined edge portions 16—16 and 19—19 of the two shoes are parallel to each other and laterally spaced apart in the expanded condition of the device, to provide clearance for relative lengthwise movement of the shoes toward each other. The shoe E is disposed within the casing B at the side thereof diametrically opposite to the shoe D, and the platelike portion 17 thereof presents an outer, lengthwise extending, transversely curved friction surface 20 engaged with the interior friction surface 12 of the casing at the corresponding side of the mechanism. At the top side thereof, the flangelike portion 18 of the shoe E is provided with an upwardly opening pocket 21 adapted to accommodate the bottom end portion of the rubber pad or block G.

The rubber pad or block F is in the form of an elongated member of circular transverse cross section, contracted at its upper and lower ends and having top and bottom flat end portions 22 and 23. The rubber block F is arranged between the shoes D and E, having its bottom end 23 resting on the bottom follower C, with the flange 18 of the shoe E supported on its upper end 22.

The rubber pad or block G is also of circular transverse cross section and contracted at its top and bottom ends. The block G is interposed between the flange 18 of the shoe E and the top follower A, having its lower end seated in the pocket 21 of said flange.

The spring H is in the form of a helical coil surrounding the casing B and the shoes D and E, having its top and bottom ends bearing on the top and bottom followers A and C and yieldingly opposing relative movement thereof toward each other.

In the assembled condition of the shock absorber, the spring H and the rubber pads or blocks F and G are under initial compression, the block F being under compression vertically between the flange 18 of the shoe E and the follower A and expanded laterally against the main body portions of said shoes, pressing the same into tight frictional contact with the interior friction surface 12 of the casing B. As shown in Figure 1, the top and bottom ends of the shoe E are spaced from the top and bottom followers a predetermined distance, in the normal expanded condition of the mechanism.

My improved shock absorber, when employed as a snubber for truck springs of a railway car, replaces one or more of the spring units of the cluster, being interposed between the usual top and bottom spring follower plates of the cluster.

The operation of my improved shock absorber is as follows: Upon compression of the truck springs between the follower plates of the spring cluster, the top follower A is forced downwardly by the top follower plate of the cluster, toward the bottom follower C, against the resistance of the spring H. During this downward movement of the follower A, the friction casing B slides on the friction surfaces of the shoes D and E, the rate of sliding movement of the casing with respect to the shoe E being less than the rate of sliding movement of the casing with respect to the shoe D during the first part of the compression stroke, the shoe D being fixed against downward displacement while the shoe E is yieldingly supported by the rubber block F. During this part of the compression stroke, while the rubber pad or block G is compressed to some extent between the follower A and the flange 18 of the shoe E, it acts as a pressure transmitting member for forcing the shoe downwardly to compress the rubber block F between the flange 18 of the shoe E and the follower C, thereby spreading the block laterally and pressing the shoes against the interior friction surface of the casing with progressively increasing force as the compression of the mechanism progresses. The described action continues until the bottom end of the shoe E comes into engagement with the follower C, thereby arresting downward movement of the shoe. Inasmuch as movement of the shoe E is arrested at this point of the compression stroke of the mechanism, there is no further relative movement between the shoe E and the shoe D to further compress the rubber block F, with the result that the friction between the casing and the shoes remains substantially constant during the remainder of the compression stroke. After movement of the shoe E has been thus arrested, sliding movement to an equal extent is had between the casing and both shoes during further compression of the mechanism, and the rubber pad G is compressed between the follower A and the flange 18 of the shoe E. This action continues until movement of the casing is arrested by engagement with the bottom follower C.

Upon upward movement of the top spring follower plate of the truck spring cluster during recoil of the springs, the actuating force is removed from the top follower A of the shock absorber, permitting return of the parts to the normal position shown in Figure 1, through the expansive action of the spring H and the rubber blocks F and G.

I claim:

1. In a friction shock absorber, the combination with a friction casing; of a pair of friction shoes slidingly telescoped within the casing; a rubber block under lateral compression between said shoes, said rubber block yieldingly opposing relative lengthwise movement of said shoes toward each other, and being laterally expandible under lengthwise compression to force said shoes apart, against the interior wall of the casing; a second rubber block reacting between the casing and one of said shoes opposing relative lengthwise movement of said shoe and casing lengthwise toward each other; and spring means reacting between the casing and the other shoe opposing relative movement of said last named shoe and casing toward each other.

2. In a friction shock absorber, the combination with a friction casing having a follower at its outer end; of a pair of friction shoes slidingly telescoped within said casing; a rubber block under lateral compression between said shoes, said shoes being lengthwise movable with respect to each other, said shoes having means thereon engaged with opposite ends of said rubber block for compressing the same therebetween upon relative lengthwise approach of said shoes; a follower at the outer end of one of said shoes; a rubber block reacting between the other of said shoes and the casing, yieldingly opposing relative movement of said last named shoe and casing toward each other; and spring means interposed between said followers yieldingly opposing relative movement thereof toward each other.

3. In a friction shock absorber, the combination with a follower at one end of the mechanism; of a second follower at the other end of the mechanism; a friction casing on said first named follower projecting toward said second named follower; a friction shoe on said second named follower extending into the casing in sliding engagement therewith; a second friction shoe slidingly engaged within said casing, said second named shoe being opposed to said first named shoe and lengthwise movable with respect to said first named shoe; spring means yieldingly opposing relative movement of said followers toward each other; a rubber block reacting between said second named shoe and first named follower to oppose relative movement of said second named shoe and first named follower toward each other; a second rubber block, under lateral compression, between said shoes for spreading the same apart, said last named block bearing at one end on said second named follower; and means on said second named shoe engaging the opposite end of said block to compress the same against said second named follower upon lengthwise relative movement of said shoes toward each other.

4. In a friction shock absorber, the combination with a follower at one end of the mechanism; of a second follower at the other end of the mechanism; spring means yieldingly opposing relative movement of said followers toward each other; a friction casing on said first named follower projecting toward said second named follower; a friction shoe on said second named follower projecting toward said first named follower; a second friction shoe laterally spaced from said first named shoe and lengthwise movable with respect to the latter, said shoes being slidingly telescoped within the casing, said second named shoe having a laterally extending follower flange at the end thereof remote from said second named follower; a rubber block interposed between the outer side of said follower flange and the first named follower, yieldingly opposing relative movement of said second named shoe and casing toward each other; and a second rubber block interposed between said shoes, said block being under lateral compression between said shoes and bearing at its opposite ends respectively on said second named follower and the inner side of said follower flange, and yieldingly opposing relative lengthwise movement of said shoes toward each other.

5. In a friction shock absorber, the combination with a top follower; of a friction casing depending from said top follower; a bottom follower, said followers being relatively movable toward each other; a pair of laterally opposed friction shoes slidingly telescoped within the casing, one of said shoes upstanding from and being rigid with said bottom follower, and the other of said shoes being lengthwise movable with respect to said shoe of the bottom follower, and having a laterally inwardly projecting follower flange at its top end; a rubber block between said shoes bearing at its top and bottom ends on the underneath side of said follower flange and the top side of said bottom follower, said block being under lateral compression between said shoes; a second rubber block interposed between said follower flange and top follower, yieldingly opposing relative movement toward each other of said top follower and the shoe having the follower flange; and a spring bearing at its top and bottom ends on said top and bottom followers, yieldingly opposing relative movement of said followers toward each other.

GEORGE E. DATH.

REFERENCES CITED

The following references are of record in the file of this patent:

UNITED STATES PATENTS

| Number | Name | Date |
| --- | --- | --- |
| 1,136,022 | McCormick | Apr. 20, 1915 |
| 1,963,067 | Barrows | June 19, 1934 |
| 2,286,845 | Cottrell et al. | June 16, 1942 |
| 2,379,078 | Haseltine | June 26, 1942 |